(12) United States Patent
Li et al.

(10) Patent No.: US 11,953,785 B2
(45) Date of Patent: Apr. 9, 2024

(54) DISPLAY PANEL, DISPLAY APPARATUS AND CONTROL METHOD THEREFOR

(71) Applicant: BOE Technology Group Co., Ltd., Beijing (CN)

(72) Inventors: Zhongxiao Li, Beijing (CN); Pengxia Liang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 522 days.

(21) Appl. No.: 17/264,361

(22) PCT Filed: May 21, 2020

(86) PCT No.: PCT/CN2020/091659
§ 371 (c)(1),
(2) Date: Jan. 29, 2021

(87) PCT Pub. No.: WO2020/238768
PCT Pub. Date: Dec. 3, 2020

(65) Prior Publication Data
US 2021/0302790 A1    Sep. 30, 2021

(30) Foreign Application Priority Data

May 28, 2019   (CN) .......................... 201910452237.6

(51) Int. Cl.
*G02F 1/13357* (2006.01)
*G02F 1/1335* (2006.01)
(Continued)

(52) U.S. Cl.
CPC .. *G02F 1/133615* (2013.01); *G02F 1/133504* (2013.01); *G02F 1/133531* (2021.01);
(Continued)

(58) Field of Classification Search
None
See application file for complete search history.

(56) References Cited

U.S. PATENT DOCUMENTS

2005/0179619 A1* 8/2005 Cornelissen ............ G02F 1/167
345/44
2009/0051836 A1   2/2009 Shimizu et al.
(Continued)

FOREIGN PATENT DOCUMENTS

CN          102588845 A       7/2012
CN          106292049 A       1/2017
(Continued)

OTHER PUBLICATIONS

Chinese Office Action for corresponding 201910452237.6 dated Mar. 2, 2021.

*Primary Examiner* — Richard H Kim
(74) *Attorney, Agent, or Firm* — ArentFox Schiff LLP; Michael Fainberg

(57) ABSTRACT

A display panel, a display apparatus and a control method therefor. The electrode group included in the display panel is used for controlling, when loaded with a voltage, the refractive index of the liquid crystal layer, such that when the refractive index of the liquid crystal layer is less than the refractive index of the first substrate, light emitted by the light-emitting module is propagated by means of total reflection in the first substrate, and when the refractive index of the liquid crystal layer is greater than the refractive index of the first substrate, the light emitted by the light-emitting module is propagated toward the second substrate from the first substrate.

17 Claims, 6 Drawing Sheets

(51) Int. Cl.
*G02F 1/1343* (2006.01)
*G09G 3/36* (2006.01)

(52) U.S. Cl.
CPC .... *G02F 1/134345* (2021.01); *G02F 1/13439* (2013.01); *G09G 3/3607* (2013.01)

(56) References Cited

U.S. PATENT DOCUMENTS

| | | | |
|---|---|---|---|
| 2013/0132443 | A1 | 5/2013 | Hart |
| 2015/0192726 | A1* | 7/2015 | Wang ................ G02F 1/133524 362/610 |
| 2019/0025644 | A1 | 1/2019 | Tan et al. |
| 2019/0121171 | A1 | 4/2019 | Tan |
| 2019/0339566 | A1 | 11/2019 | Tan et al. |
| 2020/0018674 | A1 | 1/2020 | Greenfield et al. |
| 2021/0132443 | A1* | 5/2021 | Li ........................ G09G 3/3696 |

FOREIGN PATENT DOCUMENTS

| | | |
|---|---|---|
| CN | 106324897 A | 1/2017 |
| CN | 106647093 A | 5/2017 |
| CN | 109239965 A | 1/2019 |
| CN | 109683388 A | 4/2019 |
| CN | 110187536 A | 8/2019 |

\* cited by examiner

US 11,953,785 B2

DISPLAY PANEL, DISPLAY APPARATUS AND CONTROL METHOD THEREFOR

CROSS-REFERENCE TO RELATED APPLICATIONS

The present application is a National Stage of International Application No. PCT/CN2020/091659, filed on May 21, 2020, which claims the priority of the Chinese patent application No. 201910452237.6 filed to the China National Intellectual Property Administration on May 28, 2019, both of which the entire contents are incorporated herein by reference.

FIELD

The present disclosure relates to the field of display technology, in particular to a display panel, a display apparatus and a control method therefor.

BACKGROUND

A liquid crystal display is a display device used in a large scale at present, and has a series of advantages of being high in color gamut, light and thin, fast in response time and the like. It has the mature technology in the aspects of theoretical research and practical processes. It may not only meet the needs of conventional display, but also has a variety of different display modes, such as transparent display, anti-peek display and dual-view display.

The transparent display technology is a hot research topic, but the current transparent display technology is not mature enough, and transparency cannot reach the ideal level.

SUMMARY

An example of the present disclosure provides a display panel, including:
  a first substrate, configured to receive linearly polarized light emitted by a light-emitting module on one side of the first substrate;
  a second substrate;
  a liquid crystal layer, arranged between the first substrate and the second substrate; and
  an electrode group, configured to control a refractive index of the liquid crystal layer when loaded with a voltage, so as to propagate light emitted by the light-emitting module in the first substrate by total reflection when a refractive index of the liquid crystal layer is smaller than that of the first substrate, and propagate the light emitted by the light-emitting module towards the second substrate from the first substrate when the refractive index of the liquid crystal layer is greater than that of the first substrate.

In one possible embodiment, the refractive index of the first substrate is between an o-light (ordinary light) refractive index of the liquid crystal layer and an e-light (extraordinary light) refractive index of the liquid crystal layer.

In one possible embodiment, the refractive index of the first substrate is 1.5-1.8; and the o-light refractive index of the liquid crystal layer is 1.4-1.6, and the e-light refractive index of the liquid crystal layer is 1.7-1.9.

In one possible embodiment, the electrode group includes a first electrode on one side of the first substrate facing the second substrate, and a second electrode on one side of the second substrate facing the first substrate.

In one possible embodiment, the first electrode is a planar transparent electrode, and the second electrode is a strip electrode arranged in an array.

In one possible embodiment, an orientation of a liquid crystal molecule in the liquid crystal layer is parallel to a surface of the first substrate and perpendicular to an extension direction of the second electrode when the electrode group is not powered on.

In one possible embodiment, a thickness of the first electrode does not exceed a wavelength of incident light incident from the first substrate.

In one possible embodiment, the display panel includes a plurality of sub-pixels, and each of the plurality of sub-pixels is correspondingly provided with at least two second electrodes.

In one possible embodiment, the display panel further includes a diffusion film arranged between the second substrate and the second electrode.

In one possible embodiment, a cell gap of the display panel is smaller than one sixth of a period of the second electrode or greater than one fourth of the period of the second electrode, wherein the period of the second electrode is a distance between centers of two adjacent second electrodes.

In one possible embodiment, the first substrate is made of glass.

In one possible embodiment, the display panel further includes a second orientation layer arranged on one side of the second electrode facing the first substrate.

In one possible embodiment, the display panel further includes a color film layer arranged between the second substrate and the second electrode.

In one possible embodiment, the display panel further includes a flat layer arranged between the color film layer and the second substrate.

An example of the present disclosure further provides a display apparatus, including: the display panel provided by the example of the present disclosure, and a light-emitting module arranged on one side of a first substrate.

In one possible embodiment, an included angle between light emitted by the light-emitting module and an interface formed between the first substrate and a liquid crystal layer is smaller than a total reflection angle of the interface formed between the first substrate and the liquid crystal layer when no voltage is applied.

In one possible embodiment, the light-emitting module includes a light source, a polarizer and a reflective cover, light emitted by the light source is polarized by the polarizer into linearly polarized light, the linearly polarized light enters the first substrate through the reflective cover, and a polarization state of the linearly polarized light is parallel to a surface of the first substrate and perpendicular to a propagating direction of the light.

An example of the present disclosure further provides a control method for the display apparatus provided by the example of the present disclosure, including:
  determining luminance required by each of the sub-pixels;
  determining a gray scale of each of the sub-pixels according to the luminance;
  determining a loading voltage of an electrode group corresponding to each of the sub-pixels according to the gray scale; and
  applying the corresponding loading voltage to the electrode group to change amount of light propagated from the first substrate towards the second substrate and emitted by a light-emitting module.

In one possible embodiment, the light-emitting module includes a monochromatic light source with three colors, and the control method further includes:

driving the monochromatic light source with the three colors in a time sharing mode to emit monochromatic light with three colors in a time sharing mode.

BRIEF DESCRIPTION OF THE DRAWINGS

In order to explain the technical solutions of the examples of the present disclosure more clearly, the drawings of the examples will be briefly introduced below, apparently, the drawings in the following description only relate to some examples of the present disclosure, rather than limiting the present disclosure.

DETAILED DESCRIPTION OF THE EMBODIMENTS

In order to make the objectives, technical solutions, and advantages of the examples of the present disclosure clearer, the technical solutions of the examples of the present disclosure will be described clearly and completely in combination with the accompanying drawings of the examples of the present disclosure. Apparently, the described examples are part of the examples of the present disclosure, rather than all of the examples. Based on the described examples of the present disclosure, all other examples obtained by those of ordinary skill in the art without creative labor fall within the protection scope of the present disclosure.

Unless otherwise defined, the technical terms or scientific terms used in the present disclosure shall have the usual meanings understood by those with ordinary skills in the field to which the present disclosure belongs. The words "first", "second" and similar words used in the present disclosure do not denote any order, quantity or importance, but are only used to distinguish different components. Similarly, similar words such as "a", "one" or "the" do not denote a quantity limit, but denote that there is at least one. Similar words such as "include" or "comprise" mean that the component or object appearing before the word covers the component or object listed after the word and their equivalents, but does not exclude other components or objects. Similar words such as "connect" or "couple" are not limited to physical or mechanical connections, but may include electrical connections, whether directly or indirectly. "Up", "down", "left", "right", etc. are not only used to indicate the relative position relationship, and when the absolute position of the described object changes, the relative position relationship may also change accordingly.

The first aspect of the examples of the present disclosure provides a display panel, and the transparency of the display panel may be improved to a certain extent.

Figure 1:
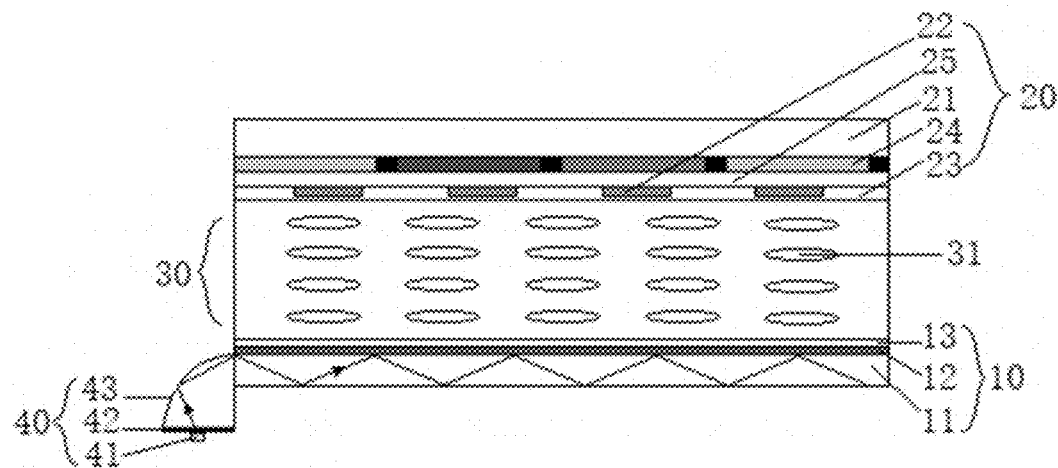
FIG. 1 shows a schematic structural diagram of a display panel provided by an example of the present disclosure.

As shown in FIG. 1, the display panel includes:

a first substrate 11, configured to receive linearly polarized light emitted by a light-emitting module 40 on one side of the first substrate 11;

a second substrate 21, opposite to the first substrate 11;

a liquid crystal layer 30, arranged between the first substrate 11 and the second substrate 21; and an electrode group, configured to control a refractive index of the liquid crystal layer 30 when loaded with a voltage, so as to propagate light emitted by the light-emitting module 40 by total reflection in the first substrate 11 when the refractive index of the liquid crystal layer 30 is smaller than that of the first substrate 11, and propagate the light emitted by the light-emitting module 40 towards the second substrate 21 from the first substrate 11 when the refractive index of the liquid crystal layer 30 is greater than that of the first substrate 11. Specifically, the electrode group may include a first electrode 12 on one side of the first substrate 11 facing the second substrate 21, and a second electrode 22 on one side of the second substrate 21 facing the first substrate 11, the first electrode 12 and the second electrode 22 may form an electric field under a loading voltage to change the refractive index of the liquid crystal layer 30, thereby changing the amount of light propagated from the first substrate 11 towards a second base plate 20 and emitted by the light-emitting module 40.

It may be seen from the examples that, the display panel provided by the example of the present disclosure may change the refractive index of the liquid crystal layer under the loading voltage by arranging the first electrode and the second electrode, thereby changing the propagated light amount. Therefore, the display panel does not need to be provided with a polarizing film in a direction parallel to a surface of the first substrate, on one hand, the process is simplified, and on the other hand, high transparency of the display panel is achieved.

Specifically, the display panel may include a first base plate 10 and the second base plate 20. The first base plate 10 may include the first substrate 11 and the first electrode 12, and the second base plate 20 may include the second substrate 21 and the second electrode 22. The first base plate 10 is configured to propagate the light emitted by the light-emitting module 40 by total reflection in the first substrate 11 when the refractive index of the liquid crystal layer 30 is smaller than that of the first substrate 11 under control of the first electrode 12 and the second electrode 22, and propagate the light emitted by the light-emitting module 40 towards the second base plate 20 from the first substrate 11 when the refractive index of the liquid crystal layer 30 is greater than that of the first substrate 11 under control of the first electrode 12 and the second electrode 22.

For example, as shown in FIG. 1, when no voltage is applied between the first electrode 12 and the second electrode 22, liquid crystals 31 in the liquid crystal layer 30 do not deflect, the refractive index of the first substrate 11 is greater than that of the liquid crystal layer the light emitted by the light-emitting module 40 is propagated by total reflection in the first substrate 11, the light may not be emitted out from the base plate, i.e. the first substrate, and at this time, the display panel is in dark state display.

Figure 4:
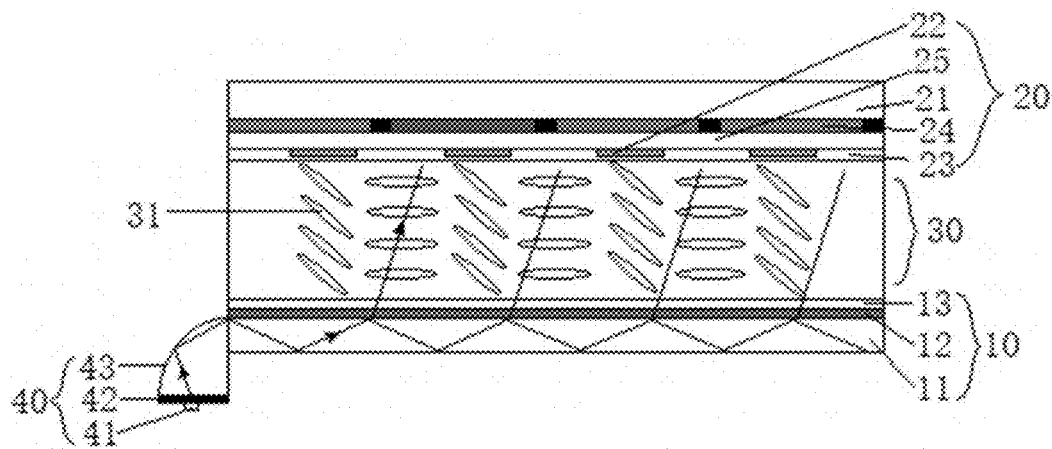
FIG. 4 is a bright state optical schematic diagram of a display panel of an example of the present disclosure in case of a low cell gap.
Figure 6:
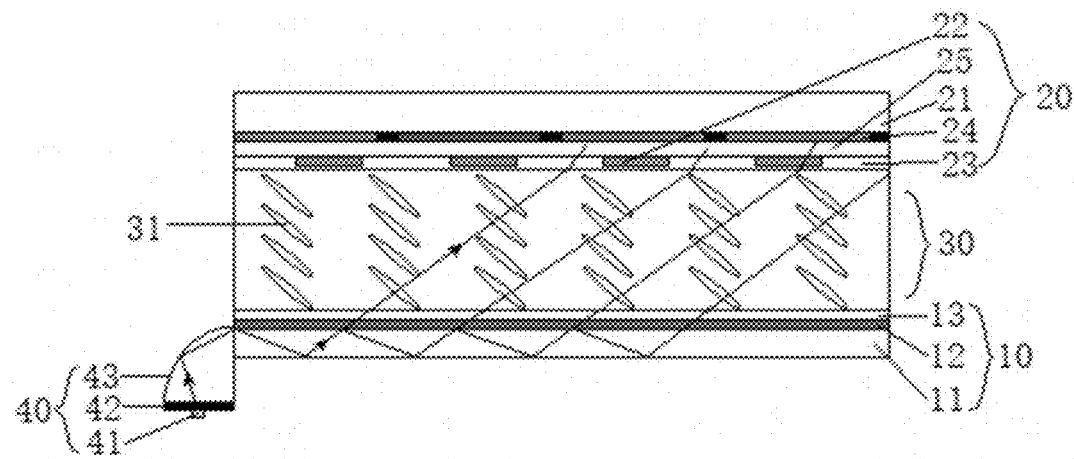
FIG. 6 is a bright state optical schematic diagram of a display panel of an example of the present disclosure in case of a high cell gap.

Referring to FIG. 4 and FIG. 6, the orientation of the liquid crystal molecules in the liquid crystal layer 30 is parallel to the surface of the first substrate 11 and perpendicular to the extension direction of the second electrode 22 when the electrode group is not powered on. When a voltage is applied between the first electrode 12 and the second electrode 22, the liquid crystals 31 deflect at the position where a vertical electric field is formed, so that the refractive index of the liquid crystal layer 30 is greater than that of the first substrate 11, and in this way, at the position where the vertical electric field is formed, the light emitted by the light-emitting module 40 is propagated from the first substrate 11 towards the second base plate 20. It may be seen that when the voltage is applied between the first electrode 12 and the second electrode 22, a function of the liquid crystal layer 30 is similar to that of a grating at the position where the vertical electric field is formed, so as to achieve light extraction.

It may be seen that when no voltage is applied between the first electrode 12 and the second electrode 22, the refractive index of the first substrate 11 is greater than that of the liquid crystal layer 30, the light emitted by the light-emitting module 40 is propagated by total reflection in the first substrate 11 (as shown in FIG. 1), but when the voltage is applied, the refractive index of the liquid crystal layer 30 is greater than that of the first substrate 11 at the position where the vertical electric field is formed, the light may be emitted out (referring to FIG. 4 and FIG. 6), and thus display is achieved. According to the display panel, a polarizing film is omitted, the transparency is higher, and the expected transparency may be increased by more than twice. In addition, with such a display panel design, it may be compatible with different display panels with large cell gap differences, and it may also be compatible with larger processing process deviation, so as to increase the yield of device production.

For example, the first base plate 10 serves as both a lower base plate of the display panel and a light guide plate of the light-emitting module 40. For example, the first substrate 11 may be prepared from high-refractive-index materials. For example, the refractive index may be 1.5-1.8 (especially 1.7). Optionally, the first substrate is made of glass.

For example, the refractive index of the materials of the first substrate 11 is between an o-light refractive index of the liquid crystal layer 30 and an e-light refractive index of the liquid crystal layer 30, so that the display panel may better achieve display. For example, the liquid crystals of the liquid crystal layer 30 are made of liquid crystals with high refractive index differences. Because the o-light refractive index is configured to achieve the total reflection of the light on the first substrate 11, the lower the refractive index is, the higher the refractive index of the first substrate 11 (usually glass) is, the less light enters the liquid crystal layer easily, and the dark state effect is better. The e-light refractive index is configured to achieve bright state display, the higher the refractive index is, the smaller a total reflection angle value of an interface formed between the first substrate 11 and the liquid crystal layer 30 is, and more incident light enters the liquid crystal layer easily by breaking through the total reflection. Here, the refractive index of the first substrate 11 is fixed, and the o-light refractive index and the e-light refractive index of the liquid crystals need to have a large difference with the refractive index of the first substrate 11, so that the refractive index difference of the liquid crystals themselves needs to be large. Therefore, the o-light refractive index of the liquid crystal layer 30 may be selected to be 1.4-1.6, and the e-light refractive index may be 1.7-1.9. With this refractive index, the display effect is better.

Optionally, as shown in FIG. 1, the first electrode 12 is a planar transparent electrode, and the second electrodes 22 are strip electrodes arranged in an array. Optionally, a thickness of the first electrode 12 does not exceed a wavelength of incident light incident from the first substrate 11, so that the influence of the first electrode 12 on the light angle may be ignored, and the materials of the first electrode 12 have a wide optional range.

Optionally, the display panel includes a plurality of sub-pixels, and each of the plurality of sub-pixels is correspondingly provided with at least two second electrodes 22. In a display state, the first electrode 12 applies a common electrode (Vcom) voltage signal, the second electrodes 22 apply gray-scale voltage signals corresponding to the sub-pixels, and a vertical electric field is formed between the first electrode 12 and the second electrodes 22 to drive the liquid crystals to deflect.

Optionally, the first base plate 10 further includes a first orientation layer 13 arranged on one side of the first electrode 12 facing the second base plate 20, and an orientation direction of the first orientation layer 13 is perpendicular to an extension direction of the second electrodes 22. The second base plate 20 further includes a second orientation layer 23 arranged on one sides of the second electrodes 22 facing the first base plate 10. Optionally, the second base plate 20 further includes a color film layer 24 arranged between the second substrate 21 and the second electrodes 22. Optionally, the second base plate 20 further includes a flat layer arranged between the color film layer 24 and the second substrate 21.

Figure 2:
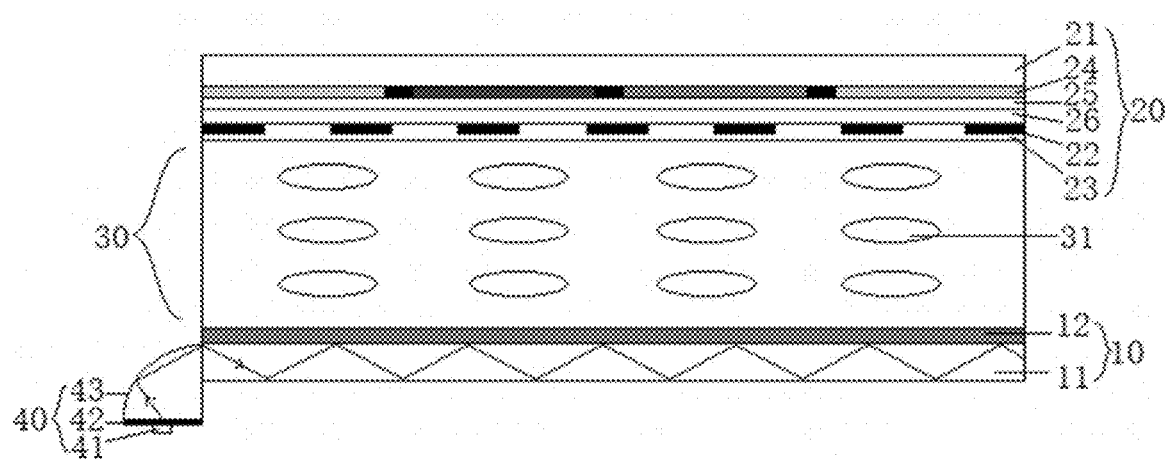
FIG. 2 shows another schematic structural diagram of a display panel provided by an example of the present disclosure.

As shown in FIG. 2, the display panel includes the first base plate 10, the second base plate 20 and the liquid crystal layer 30 arranged between the first base plate 10 and the second base plate 20. The first base plate 10 includes the first substrate 11 and the first electrode 12, and the second base plate 20 includes the second substrate 21 and the second electrodes 22. The first substrate 11 is configured to receive the light of the light-emitting module 40 arranged on one side of the first substrate 11. The first electrode 12 and the second electrodes 22 may form the electric field under the loading voltage to change the refractive index of the liquid crystal layer 30, and thus the amount of light propagated from the first substrate 11 towards the second base plate 20 and emitted by the light-emitting module 40 is changed.

For example, as shown in FIG. 2, the second base plate 20 further includes a diffusion film 26 arranged between the second substrate 21 and the second electrodes 22. The diffusion film 26 has an effect of uniformizing light, and the wide viewing angle display of the display panel is achieved.

For example, as shown in FIG. 2, the first base plate 10 does not include the first orientation layer 13 in FIG. 1, thus the deviation between the orientation direction of liquid crystal molecules and a design value in the actual manufacturing process may be avoided, and the smoothness of the total reflection interface formed between the liquid crystal layer 30 and the first base plate 10 may also be ensured.

However, the first base plate 10 adopts a non-orientation layer design, the liquid crystal molecules are also more prone to small angle changes, and adverse effects such as light leakage may be caused. The display panel of the example may solve the problem to a certain extent, and the specific analysis is as follows.

For example, when the liquid crystal molecules have a small angle of warping, the incident light may be more inclined to a plane where the first base plate 10 is located, at this time, the liquid crystal molecules are required to be more vertical to achieve light extraction, even if the liquid crystal molecules have warping, the condition of total reflection propagation may not be broken through, so as to avoid light leakage caused by warping of the liquid crystal molecules. In addition, for example, the e-light refractive index of the liquid crystal layer may be required to be greater than that of the lower base plate, so that the light extracting efficiency of the device may be kept unchanged.

Figure 3A:
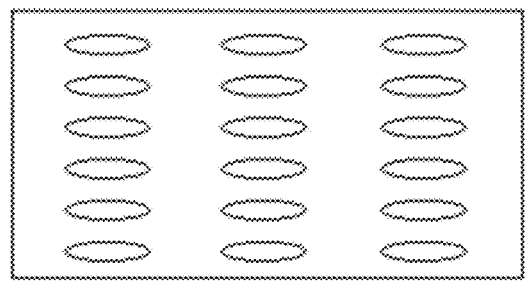
FIG. 3A is a top view of an orientation effect of liquid crystal molecules when an orientation direction of the liquid crystal molecules meets a design value.
Figure 3B:
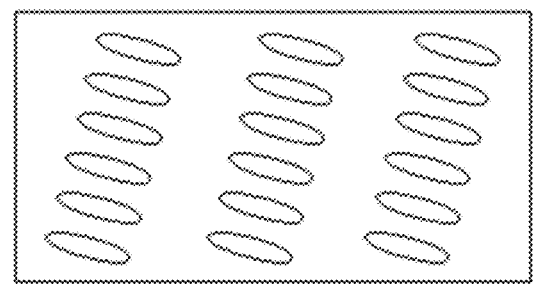
FIG. 3B is a top view of an orientation effect of liquid crystal molecules when there is a regular deviation in an orientation direction of the liquid crystal molecules.
Figure 3C:
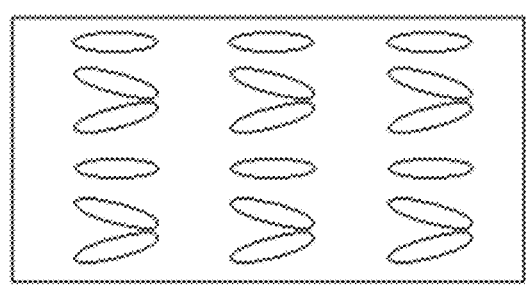
FIG. 3C is a top view of an orientation effect achieved by liquid crystal molecules when there is an irregular deviation in an orientation direction of the liquid crystal molecules.

As shown in FIG. 3A, FIG. 3B and FIG. 3C, they are respectively top views of the orientation effects achieved by the liquid crystal molecules when the orientation direction of the liquid crystal molecules meets a design value, the orientation direction of the liquid crystal molecules has a regular deviation, and the orientation direction of the liquid crystal molecules has an irregular deviation. The liquid crystal molecules may have regular orientation deviation and irregular orientation deviation, however, in any deviation case, the deviation of the liquid crystal molecules will not cause the light leakage of polarized incident light, because an included angle between a light polarization direction and a long-axis direction of the liquid crystal molecules has no obvious change, a shown refractive index is about an o-light refractive index, and in addition, the orientation deviation of the liquid crystal molecules is small angle deviation, so that a propagation direction of light may not be obviously influenced. For example, the above-mentioned method of designing the incident light angle may be adopted to avoid the influence of the light leakage caused by this part of the liquid crystal deviation. Meanwhile, as in the above case, the light extraction efficiency of the display panel is kept unchanged.

Optionally, when a liquid crystal cell is a low-cell-gap liquid crystal cell, a liquid crystal cell gap is smaller than one sixth of a period of the second electrode; or when the liquid crystal cell is a high-cell-gap liquid crystal cell, the liquid crystal cell gap is greater than one fourth of the period of the second electrode; and the period of the second electrode refers to the distance between the centers of two adjacent second electrodes.

FIG. 4 shows a bright state optical schematic diagram of the display panel in the case of the low cell gap.

Figure 5:
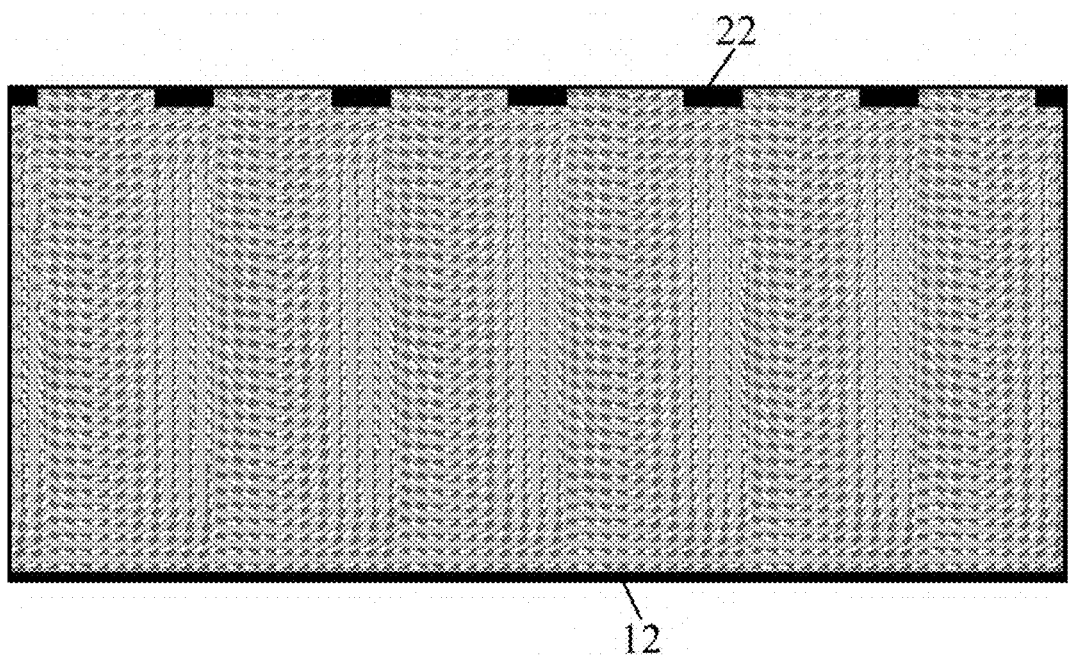
FIG. 5 is a schematic diagram of a simulation result of the display panel shown in FIG. 4.

At this time, the first electrode 12 and the second electrodes 22 are powered on, wherein a Vcom voltage signal is applied to the first electrode 12, a gray-scale voltage signal is applied to the second electrodes 22, a vertical electric field is formed between the first electrode 12 and the second electrodes 22 to drive the liquid crystals to deflect, and the deflection situation of the liquid crystals is shown as liquid crystals 31 in FIG. 4. The liquid crystals 31 below each second electrode 22 may be warped at an angle, the liquid crystals in a gap position between the adjacent second electrodes 22 may not deflect or has a small deflection angle, at this time, different positions show different liquid crystal refractive indexes, which is equivalent to a grating structure, and the light of total reflection in the first base plate 10 may be extracted, so as to achieve the bright state display. According to above process description, a simulation result is given as shown in FIG. 5. It may be seen from FIG. 5 that the different deflection states of the liquid crystals 31 below each second electrode 22 and below the gap meet the description of the schematic diagram in FIG. 4.

Optionally, in the case of low cell gap, the gray-scale control of the display panel can change the deflection angle of the liquid crystals by changing the electric field to achieve different optical path difference, so as to change the gray scale. Specifically, the input light quantity of each sub-pixel is a fixed value, the gray scale is related to the diffraction efficiency of the grating structure, wherein the correlation quantity of the diffraction efficiency is the height of a grating or the optical path difference of the grating, within a certain range of optical path difference, the greater the optical path difference is, the greater the diffraction efficiency is, therefore, different optical path differences may be achieved by controlling the deflection angle of the liquid crystals, so as to achieve gray-scale display.

FIG. 6 shows a bright state optical schematic diagram of the display panel in the case of the high cell gap.

Figure 7:
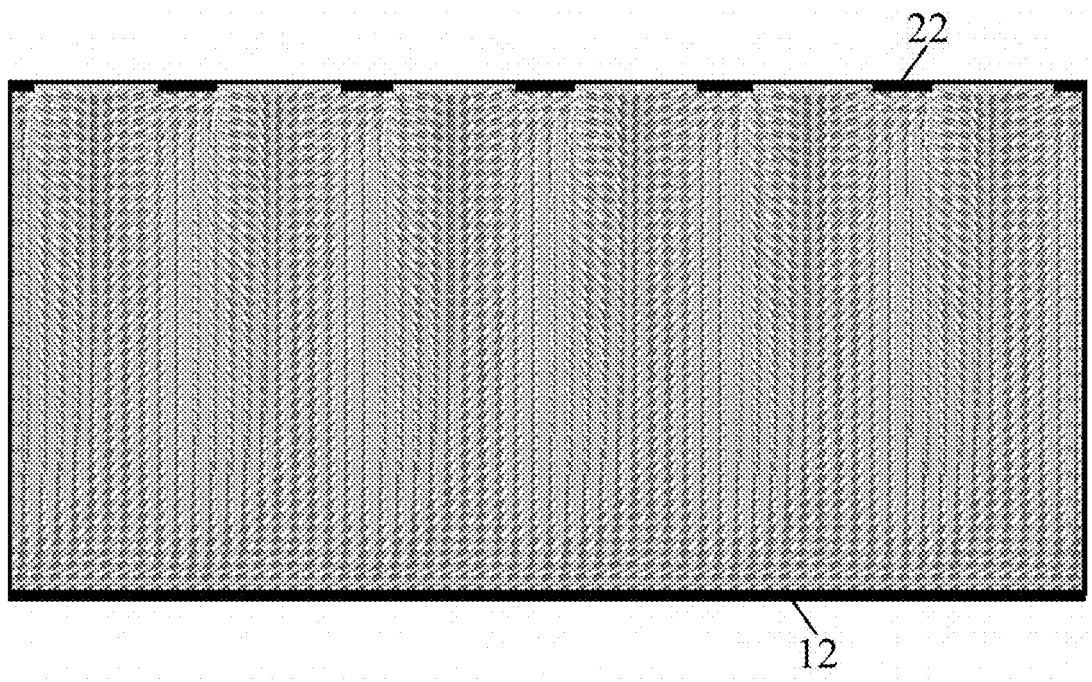
FIG. 7 is a schematic diagram of a simulation result of the display panel shown in FIG. 6.

At this time, the first electrode 12 and the second electrodes 22 are powered on, wherein the Vcom voltage signal is applied to the first electrode 12, the gray-scale voltage signal is applied to the second electrodes 22, a vertical electric field is formed between the first electrode 12 and the second electrodes 22 to drive the liquid crystals to deflect, and the liquid crystal deflection state is shown as liquid crystals in FIG. 6. The liquid crystals facing the first base plate 10 may all be warped, the liquid crystals show a state of high refractive index, the light may enter the liquid crystal layer and diffract through the liquid crystal layer at an electrode layer where the second electrodes 22 are located, the angle deflection meets the emitting condition, and bright state display is achieved. FIG. 7 shows a simulation result given based on the above conditions. It may be seen from FIG. 7 that all the liquid crystals facing the first base plate 10 have been erected, and when the liquid crystal cell gap is larger, the erection situation is more obvious, this is because the driving voltage required at this time is larger.

In the first base plate, the total reflection light does not have a single angle, but has a certain divergence angle, the liquid crystal refractive index required for the total reflection corresponding to different angles is different, the warping angle of the liquid crystals may be changed by controlling the electric field, the larger the warping angle is, the broader the angle value of the light capable of entering the liquid crystal layer is, and more light enters the liquid crystal layer. In this way, with the diffraction efficiency unchanged, the larger the electric field is, the larger the warping angle of the liquid crystals is, so that the transmittance is improved, and the gray-scale display is achieved.

Figure 8:
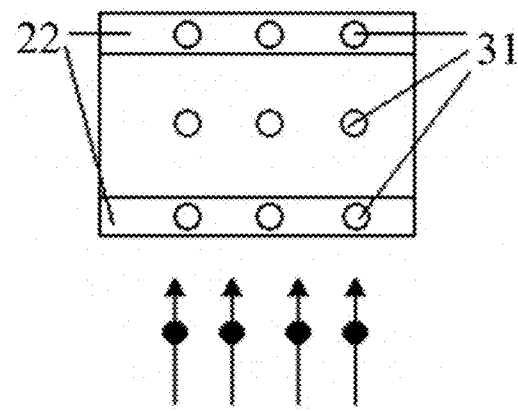
FIG. 8 is a top view of a liquid crystal state in the case shown in FIG. 4.
Figure 9:
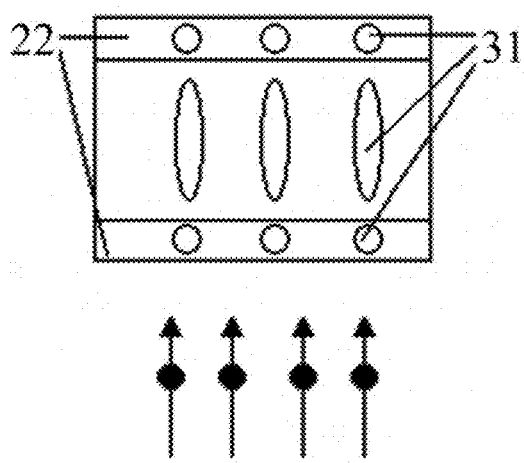
FIG. 9 is a top view of a liquid crystal state in the case shown in FIG. 6.

In order to understand the above solutions more conveniently, the top views of the liquid crystal states in two cases are given. As shown in FIG. 8 and FIG. 9, strip-shaped areas correspond to the second electrodes 22, a propagation direction of the incident light is the arrow direction, the polarization direction of the incident light is perpendicular to the paper, and the incident light is replaced by points in the figure.

According to the simulation result, when the liquid crystal cell gap is smaller than one sixth of the electrode period (the distance between the centers of the two adjacent second electrodes), the situation of low cell gap is met, and when the liquid crystal cell gap is greater than one fourth of the electrode period, the situation of high cell gap is met.

Optionally, the first electrode 12 and the second electrodes 22 are both made of indium tin oxide (ITO). In this way, the electrodes made from the ITO may further improve the transparency of the display panel.

The second aspect of the examples of the present disclosure provides a display apparatus which may improve the transparency of a display panel to a certain extent.

Referring to FIG. 1 and FIG. 2, the display apparatus includes:
- any one of or arrangement and combination of the embodiments of the display panel; and a light-emitting module 40 arranged on one side of a first substrate 11.

It should be noted that the display apparatus in the example may be any product or component with a display function, such as electronic paper, a mobile phone, a tablet computer, a television, a notebook, a digital photo frame and a navigator.

It may be seen from the above example that the display apparatus provided by the example of the present disclosure may change a refractive index of a liquid crystal layer under a loading voltage by arranging a first electrode and a second electrode, so as to achieve the change of the propagated light amount, so that a polarizing film is omitted from the display panel. On the one hand, the process is simplified, and on the other hand, the high transparency of the display panel is achieved. Meanwhile, the light-emitting module of the display panel is arranged on one side of a first base plate, namely is a side-entry light source, and the transparency of the display panel may be further improved.

Optionally, as shown in FIG. 1 and FIG. 2, the display apparatus may also include the light-emitting module 40, and an included angle formed between the light emitted by the light-emitting module and an interface formed between the first substrate and the liquid crystal layer is smaller than a total reflection angle of the interface formed between the first substrate and the liquid crystal layer when no voltage is applied. In this way, the display panel may keep a dark state without light leakage when the first electrode and the second electrode are not loaded with the voltage.

Optionally, the light-emitting module 40 includes a light source 41 (optionally point LEDs), a polarizer 42 and a reflective cover 43. The light emitted by the light source is polarized by the polarizer 42 into linearly polarized light, the linearly polarized light enters the first substrate 11 through the reflective cover 43, a polarization state of the linearly polarized light is parallel to the surface of the first substrate 11 and perpendicular to a propagation direction of the light, and thus the display effect is better achieved. The light is collimated and coupled into the first substrate 11 through the reflective cover.

The third aspect of the examples of the present disclosure provides a control method of a display apparatus which may improve the transparency to a certain extent.

Figure 10:
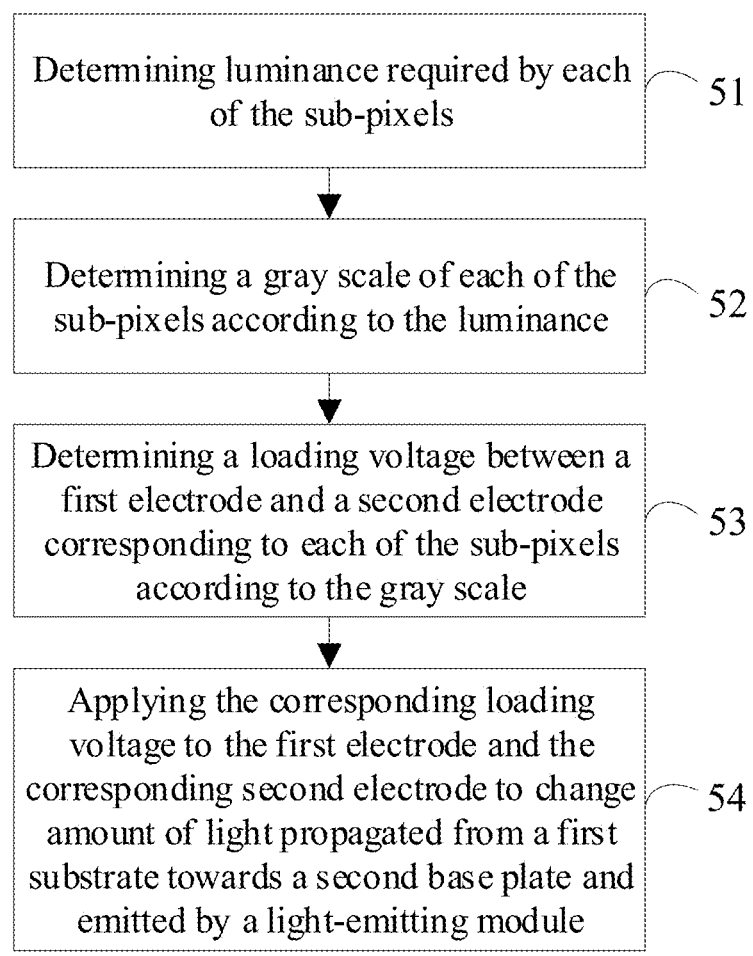
FIG. 10 is a schematic flow diagram of a control method of a display apparatus provided by an example of the present disclosure.

As shown in FIG. 10, the control method of the display apparatus is applied to any one of the examples or the arrangement and combination of the examples of the display apparatus and includes:
- step 51, luminance required by each of the sub-pixels is determined;
- step 52, according to the luminance, a gray scale of each of the sub-pixels is determined;
- step 53, according to the gray scale, a loading voltage of an electrode group corresponding to each of the sub-pixels is determined, that is, a loading voltage between a first electrode and a second electrode corresponding to each sub-pixel is determined; and
- step 54, the corresponding loading voltage is applied to the electrode group, that is, the corresponding loading voltage applied to the first electrode and the corresponding second electrode is determined, so as to change the amount of light propagated from the first substrate towards the second base plate and emitted by a light-emitting module.

It may be seen from the above example that the control method of the display apparatus provided by the example of the present disclosure achieves the change of the propagated light amount by making the first electrode and the second electrode change the refractive index of a liquid crystal layer under the loading voltage, so as to achieve display; and meanwhile, a driving voltage of the second electrode is adjusted according to different gray scales, and thus the gray-scale display is achieved.

Optionally, the light-emitting module includes a monochromatic light source with three colors, and the control method further includes: the monochromatic light source with the three colors is driven in a time sharing mode, so as to emit monochromatic light with three colors in a time sharing mode.

In this way, the three-color light source of the light-emitting module emits the red, green and blue backlight in turn according to the time sequence, so as to form the white light and achieve the display.

The above descriptions are only preferred examples of the present disclosure and are not configured to limit the present disclosure. For those skilled in the art, the present disclosure may have various modifications and changes. Any modification, equivalent replacement, improvement, etc., made within the spirit and principle of the present disclosure shall be included in the protection scope of the present disclosure.

What is claimed is:

1. A display panel, comprising:
   a first substrate, configured to receive linearly polarized light emitted by a light-emitting module on one side of the first substrate;
   a second substrate;
   a liquid crystal layer, arranged between the first substrate and the second substrate; and
   an electrode group, configured to control a refractive index of the liquid crystal layer when loaded with a voltage, so as to propagate light emitted by the light-emitting module in the first substrate by total reflection when the refractive index of the liquid crystal layer is smaller than that of the first substrate, and propagate the light emitted by the light-emitting module towards the second substrate from the first substrate when the refractive index of the liquid crystal layer is greater than that of the first substrate; wherein:
   the electrode group comprises a first electrode on one side of the first substrate facing the second substrate, and a second electrode on one side of the second substrate facing the first substrate;
   when a cell gap of the display panel is smaller than one sixth of a period of the second electrode, the cell gap is a low cell gap, and liquid crystals in the liquid crystal layer show different liquid crystal refractive indexes at different positions;
   when the cell gap of the display panel is greater than one fourth of the period of the second electrode, the cell gap is a high cell gap, and light passing through the liquid crystal layer is diffracted in an electrode layer where the second electrode is located; and the period of the second electrode is a distance between centers of two adjacent second electrodes.

2. The display panel according to claim 1, wherein the refractive index of the first substrate is between an o-light (ordinary light) refractive index of the liquid crystal layer and an e-light (extraordinary light) refractive index of the liquid crystal layer.

3. The display panel according to claim 2, wherein the refractive index of the first substrate is 1.5-1.8; and the o-light refractive index of the liquid crystal layer is 1.4-1.6, and the e-light refractive index of the liquid crystal layer is 1.7-1.9.

4. The display panel according to claim 1, wherein the first electrode is a planar transparent electrode, and the second electrode is a strip electrode arranged in an array.

5. The display panel according to claim 4, wherein an orientation of a liquid crystal molecule in the liquid crystal layer is parallel to a surface of the first substrate and perpendicular to an extension direction of the second electrode when the electrode group is not powered on.

6. The display panel according to claim 4, wherein a thickness of the first electrode does not exceed a wavelength of incident light incident from the first substrate.

7. The display panel according to claim 4, comprising a plurality of sub-pixels, wherein each of the plurality of sub-pixels is correspondingly provided with at least two second electrodes.

8. The display panel according to claim 1, further comprising a diffusion film, arranged between the second substrate and the second electrode.

9. The display panel according to claim 1, wherein the first substrate is made of glass.

10. The display panel according to claim 1, further comprising a second orientation layer, arranged on one side of the second electrode facing the first substrate.

11. The display panel according to claim 10, further comprising a color film layer, arranged between the second substrate and the second electrode.

12. The display panel according to claim 11, further comprising a flat layer, arranged between the color film layer and the second substrate.

13. A display apparatus, comprising: the display panel according to claim 1 and a light-emitting module arranged on one side of a first substrate.

14. The display apparatus according to claim 13, wherein an included angle between light emitted by the light-emitting module and an interface formed between the first substrate and a liquid crystal layer is smaller than a total reflection angle of the interface formed between the first substrate and the liquid crystal layer when no voltage is applied.

15. The display apparatus according to claim 13, wherein the light-emitting module comprises a light source, a polarizer and a reflective cover, light emitted by the light source is polarized by the polarizer into linearly polarized light, the linearly polarized light enters the first substrate through the reflective cover, and a polarization state of the linearly polarized light is parallel to a surface of the first substrate and perpendicular to a propagating direction of the light.

16. A control method for the display apparatus according to claim 13, comprising:

determining luminance required by each of the sub-pixels;

determining a gray scale of each of the sub-pixels according to the luminance;

determining a loading voltage of an electrode group corresponding to each of the sub-pixels according to the gray scale; and applying the corresponding loading voltage to the electrode group to change amount of light propagated from the first substrate towards the second substrate and emitted by the light-emitting module.

17. The control method according to claim 16, wherein the light-emitting module comprises a monochromatic light source with three colors, and the control method further comprises:

driving the monochromatic light source with the three colors in a time sharing mode to emit monochromatic light with three colors in a time sharing mode.

* * * * *